US009473904B2

(12) United States Patent
Bennett

(10) Patent No.: US 9,473,904 B2
(45) Date of Patent: Oct. 18, 2016

(54) METHOD AND SYSTEM FOR DETERMINING AND TRIGGERING TARGETED MARKETING CONTENT

(71) Applicant: HTI IP, LLC, Atlanta, GA (US)

(72) Inventor: Richard Bennett, Dacula, GA (US)

(73) Assignee: Verizon Telematics Inc., Atlanta, GA (US)

( * ) Notice: Subject to any disclaimer, the term of this patent is extended or adjusted under 35 U.S.C. 154(b) by 511 days.

(21) Appl. No.: 13/625,739

(22) Filed: Sep. 24, 2012

(65) Prior Publication Data

US 2014/0087760 A1 Mar. 27, 2014
US 2016/0210670 A9 Jul. 21, 2016

Related U.S. Application Data

(60) Provisional application No. 61/538,562, filed on Sep. 23, 2011.

(51) Int. Cl.
*H04W 4/04* (2009.01)
*G06Q 30/02* (2012.01)
*H04W 4/20* (2009.01)

(52) U.S. Cl.
CPC ............ *H04W 4/046* (2013.01); *G06Q 30/02* (2013.01); *H04W 4/206* (2013.01)

(58) Field of Classification Search
CPC .............. G06Q 30/0261; G06Q 30/0265; G06Q 30/0266; G06Q 30/02; G06Q 30/0205; H04W 4/02; H04W 4/046; H04W 4/023; H04W 4/025

USPC ............ 455/414.1, 456.3, 456.5; 705/14.58, 705/14.62–14.64
See application file for complete search history.

(56) References Cited

U.S. PATENT DOCUMENTS

| | | | |
|---|---|---|---|
| 2003/0216963 A1* | 11/2003 | Ishiwaka et al. ............... | 705/14 |
| 2008/0018495 A1* | 1/2008 | Dunning et al. .............. | 340/988 |
| 2010/0153207 A1* | 6/2010 | Roberts et al. ............ | 705/14.41 |
| 2011/0078024 A1* | 3/2011 | Messier et al. ............ | 705/14.63 |
| 2011/0294466 A1* | 12/2011 | Tang et al. .................... | 455/411 |
| 2011/0301839 A1* | 12/2011 | Pudar .................... | H04W 4/046 701/408 |
| 2012/0054035 A1* | 3/2012 | Nam .................. | G06Q 30/0261 705/14.58 |
| 2012/0290150 A1* | 11/2012 | Doughty et al. .................. | 701/2 |
| 2012/0303457 A1* | 11/2012 | Crolley et al. ............. | 705/14.58 |
| 2012/0323692 A1* | 12/2012 | Shutter ...................... | 705/14.63 |

* cited by examiner

*Primary Examiner* — Nam Huynh

(57) ABSTRACT

A mobile device in, or at, a vehicle sends a vehicle status message to a remote host upon occurrence of a trigger event, such as turning off the vehicle's engine. The remote host processes the vehicle status message and determines whether it can access, or find, content that is associated with location information contained in the vehicle status message. If so, the remote host forwards the content in a content message to a user device, which may or may not be the device that transmitted the vehicle status message. The remote host typically associates the user device with the vehicle, or mobile device therein, from which the vehicle status message emanated. Thus, the user device receives content corresponding to the location of the vehicle when the trigger event occurred. The content may include advertising, product promotion, tourist information, weather, traffic, or other information relevant to the trigger event occurrence location.

20 Claims, 2 Drawing Sheets

METHOD AND SYSTEM FOR DETERMINING AND TRIGGERING TARGETED MARKETING CONTENT

CROSS REFERENCE TO RELATED APPLICATION

The present application claims priority under 35 U.S.C. 119(e) to U.S. Provisional Patent Application No. 61/538,562 filed on Sep. 23, 2011, entitled "Method and system for determining and triggering targeted marketing content," which the present application incorporates by reference in its entirety.

FIELD

The invention relates to determining content to deliver to a user device based on the proximity and demography of a user using the device when a mobile device associated with the user sends a trigger.

BACKGROUND

Location-Based Merchandising, also referred to as Geo-Marketing, Proximity Marketing, Location-BasedMarketing, or lo-so apps are becoming widespread especially when combined with social media applications. Generally, people use lo-so apps on their phones to "check in" whenever they go places. Global Positioning Satellitesystems ("GPS") locate, the users and determine what "venue" they might be near, giving them options to select a location or create a new listing. These "check ins" allow friends to know the whereabouts of a user, or where they frequently go. Some services allow users to leave location-based tips for friends to discover later, and several involve social competitions, or the ability to unlock digital badges, stickers, and prizes. Businesses can announce specials or promotions through these applications so that when users "check in" they receive notifications of nearby deals or promotions.

Location-Based Merchandising is the localized wireless (distribution of advertising content associated with a particular place. Transmissions can be received by individuals at or near the particular location who wish to receive them and have the necessary equipment to do so. Distribution may be via a traditional localized broadcast, or more commonly is specifically targeted to devices known to be in a particular general area.

The location of a device may be determined by:
  A cellular phone being within an antenna beam pattern of a particular cell;
  A Bluetooth or WiFi device being within range of a transmitter;
  An Internet enabled device with GPS enabling it to request localized content from Internet servers.

Communications may be further targeted to specific groups within a given location, for example content in tourist hot spots may only be distributed to devices registered outside the local area. Communications may be both time and place-specific, e.g. content at a conference venue may depend on the event in progress.

Uses of proximity marketing include distribution of media at concerts, information (weblinks on local facilities), gaming and social applications, promotions, and advertising.

Bluetooth-Based Systems

Bluetooth, a short-range wireless system supported by many mobile devices, is one transmission medium used for proximity marketing. The process of Bluetooth based proximity marketing involves setting up Bluetooth "broadcasting" equipment at a particular location and then sending information which can be text, images, audio or video to Bluetooth enabled devices within range of the broadcast server. Other standard data exchange formats such as Vcard can also be used.

It used to be the case that due to security fears, or a desire to save battery life, many users keep their Bluetooth devices in OFF mode, or ON but not set to be 'discoverable'. Because of this, often regions where Bluetooth proximity marketing is in operation it is accompanied by advising via traditional media—such as posters, television screens or field marketing teams—suggesting people make their Bluetooth handsets 'discoverable' in order to receive free content—this is often referred to as a "Call-to-Action." A 'discoverable' Bluetooth device within range of the server is automatically sent a message asking if the user would like to receive the free content.

Some mobile phones have Bluetooth switched ON by default, and many users leave Bluetooth switched on for easy and automatic connection with car kits and headsets. Some implementations of Bluetooth proximity marketing require users to run Java applications on their phones to enable them to receive content. This has the advantage that only those who choose to will receive content. Others require no handset-side software.

The diversity of mobile phones is huge. Screen sizes and supported file formats varies greatly. To obtain the optimal user experience with Bluetooth Marketing, the Bluetooth system automatically recognizes phone models and delivers the content automatically when a device is within a predefined geographic region.

GSM-Based Systems

GSM 03.41 which defines the Short Message Service-Cell Broadcast (SMS-CB) allows messages (advertising, public information, etc.) to be broadcast to all mobile users in a specified geographical area. Some phones/devices have an option to turn off the receipt of such messages. There are provisions for "welcome" messages to be sent when entering new countries introducing networks available. There are also capabilities for messages to be sent by emergency services. GSM localization accuracy varies depending on location.

For example, in the Philippines. GSM-based proximity broadcast systems are used by select Government Agencies for information dissemination on Government-run community-based programs to take advantage of its reach and popularity. It is also used for commercial service known as Proxima SMS. Philippines has the world's highest traffic of SMS (locally referred to as texting). Bluewater, a super-regional shopping centre in the UK, has a GSM based system supplied by NTL to help its GSM coverage for calls, it also allows each customer with a mobile phone to be tracked though the centre which shops they go into and for how long. The system enables special offer texts to be sent to the phone.

Current Technology Challenges

The current technology for Location-Based merchandising has certain limitations that inhibit widespread utilization. These limitations include:
  1. May require public broadcasting of location information, which can create privacy concerns and thus may appeal to a limited market of customers;
  2. May require loading of custom app on mobile phone—one app per merchant, limited phone types;
  3. May require registration with each participating merchant—market limiting;

4. Widespread use will drive extensive usage-based charges for the consumer; and
5. Complicated for merchant and general public—market limiting.

SUMMARY

The Location-Based Merchandising system is designed to expand the market opportunity to virtually all mobile consumers. The primary objectives are:
1. Compatibility with all mobile phones and other wireless devices
2. Do not require a specialized mobile application—uses existing mobile applications like e-mail and SMS, or other similar technology application
3. Do not require the mobile phone to have or use, GPS, Bluetooth or Wi-Fi
4. Permit telematics subscriber to opt-in for merchants meeting their needs.

The method and system envisioned uses a subscriber's mobile phone, or other wireless mobile device, and a telematics-equipped vehicle. In an embodiment, merchants create a profile, including location information, targeted customer profile, and other parameter information related to products or services they offer at given locations. The participating subscriber/consumer creates a profile, including desired merchant profile characteristics and an alert profile. In an alternative embodiment, a services provider can create the subscriber profile from information it already has, for example, a telematics services provider may use subscriber information (age, gender, race, marital status, etc.) or request such information from the subscriber. The method and system can then compare the subscriber profile with various retailer, or other provider, profile information.

The Location-Based method system for determining and triggering advertising content operates when a trigger occurs, rather than upon mere entering a geographic region, such as proximate a place of business that wishes to send targeted advertising to potential customers near it. An example of a trigger includes the subscriber/consumer changing the vehicle's operating mode from 'On' to 'Off' (e.g., turning off the ignition key, or pressing a run/stop, or stop button.)

In an embodiment, when a trigger occurs, the following steps may be taken:
1. The vehicle telematics module transmits vehicle and location information to a central data warehouse, or host computer.
2. A software or firmware or other similar means) method running at a central data warehouse receives the transmitted vehicle information and retrieves customer profile information associated with the received vehicle data.
3. After determining that the received data corresponds to a subscriber/customer who has opted in, or to a VIN of a vehicle associated with a user who has opted in. the method determines whether location and time information contained in the received vehicle status message match (either a complete match or partial overlap of information) records in the merchant profile database, i.e., the server determines whether it can access content pertinent to location information corresponding to information contained in the vehicle status message. If there is not a match, no action occurs.
4. If there is a match, or overlap, between the customer profile information associated with the received vehicle status message and one, or more, record, or records, in the merchant profile, then the system transmits a message to a mobile wireless device of the customer/subscriber. The message format (SMS or email or voice or other electron message) may be specified in the customer profile information.

Thus, the telematics unit determines that the vehicle has been turned off, transmits a vehicle status message to a telematics services providers central host computer confirming the vehicle has been turned off. The telematics central host computer then looks up information in a database/table that associates vehicle information (e.g., vehicle identification number "VIN", EMSI number, or other telematics device identifier) with stored customer profile information (e.g., car owner/telematics services subscriber demographic information and vehicle location information.) Then, the telematics central host computer retrieves merchant information that a merchant has tagged, or associated, as applicable to the same, or similar, demographic and location information. The telematics host computer then forwards advertising/promotional information/coupon information to a mobile wireless access number or identifier associated with the vehicle owner/telematics subscriber, or other user such as a passenger, family member thereof, or a lessee of the vehicle. The mobile wireless access number typically will correspond to the owner's/subscriber's personal cellular phone, smartphone, wireless tablet, wireless-enabled computer device, or other similar wireless device. The advertising/promotional information will typically correspond to merchants within walking distance of the vehicle's location. However, the targeted advertisement/promotional/coupon content could also correspond to a competitor merchant of a merchant proximate the vehicle's location, wherein the competitor's location may be remote, and not within walking distance of the vehicle location when it was turned off. Advertisement/promotional/coupon content is not limited to association with retail merchants. Such content may also be associated with merchandise manufacturers of items such as, for example, clothing, durable goods, groceries, and other consumer products that may be sold through the nearby merchant.

In another aspect, in addition to a VIN, the vehicle information sent from the vehicle telematics device upon turn-off may include information that indicates the driver of the car, how many passengers are in the car when it turned off. For example, many cars may have the capability to report a profile based on a key used to start the car. If key 1 has been associated with driver 1, and key 2 associated with driver 2, the vehicle information can report that driver 1 was driving when the car turned off. Alternatively, the vehicle may be able to report the radio station, media content from an mp3 player or similar, seat position, or other configuration that indicates driver 1. In addition, seat sensors can determine, and thus the vehicle can report, that two passenger seats were occupied, for example. Furthermore, seat pressure sensors can also determine whether a child or an adult is in a seat based on weight (more pressure on the sensor). Thus, if the vehicle information indicates a husband alone was driving the car, an advertisement, or coupon, for a store near the car that sells tools might be transmitted from the telematics central host computer to the husband's smart phone. But, if the vehicle information indicates that the wife and two children were in the car when it was turned off, then the telematics central host computer may transmit a coupon for children's shoes and for a kids meal at a shoe store and food court restaurant, respectively, at a mall near the vehicle 'off' location.

The telematics device in the car, and the telematics central host can be configured to provide more, or less, detail regarding the occupants of the vehicle. Furthermore, the level of detail of the demographic information can be selected according to, for example, answers the subscriber/car owner provides in response to inquiries made when opting in, or when later altering the customer profile.

In addition to providing coupons, or advertising, regarding a merchant within walking distance, upon receiving vehicle information after an operator turns 'off' a car, a telematics central host computer may send coupons or advertising to the user of the vehicle's mobile device for merchants that compete with merchants that are proximate to the current location of the vehicle. For example, if a driver turns off their car's engine in the parking lot of a first large home improvement store, the telematics central host computer can receive vehicle information from the vehicle and send a coupon for a discount on paint at a competing, second large home improvement store. Furthermore, by using driver/passenger information, the telematics host computer can automatically customize the advertising or coupon for the competing home improvement store according to the vehicle, driver, and passenger information. For example, if the telematics central host computer determines that a vehicle for which it just received information from is a five year old minivan, and four passenger seats were occupied, the coupon or advertisement for the competitor and/or the proximate home improvement store) may relate to lighting or appliances. On the other hand, if the vehicle information indicates that the driver of the minivan is a man, the coupon or advertising may relate to tools or lawn care products. And, if the demographic information stored in the telematics central host computer indicates that the driver of the minivan is an unmarried man, then the coupons or advertising might relate to discounts for sports team merchandise likes rugs or curtains.

Generally, a telematics device in a vehicle couples to a vehicle computer bus, such as, for example, a CAN bus. Information available on the CAN bus, some of which can be used as trigger information, typically includes the vehicle's VIN, diagnostic information related to sensor health, certain performance parameter data (mass air flow, engine speed, vehicle speed, engine temperature, etc.), and data from body sensors such as door locks, door open switches, seat sensors for activating air bags, current radio station, current media playing through a media head unit, windshield, wiper operation status, etc. A telematics central host computer can receive any of these data related to any of these parameters and body status indicators and make determinations as to who is driving the car and who is riding, in the car. The information transmitted from the vehicle to the telematics host computer typically would not indicate the actual identity of the driver or passengers, but could provide an inference, or and 'educated guess' based on information stored, in a database, that the driver is the vehicle owner, for example, and the passengers are family members. Car makers may also include certain biometric identifiers, such as sensors for receiving information relative to fingerprint, retinal print, voice print, etc. for use in permitting operational access to the vehicle (i.e., permit operation of the vehicle by a registered owner or user, and prohibit operation by someone whose biometric information does not match that of a registered user). Upon receiving the information, the telematics central computer processes the received vehicle and driver/passenger information and uses it in conjunction with other information, such as demographic information, associated with the vehicle information and driver/passenger information, to determine an appropriate commercial offering, such as advertising, coupons, media content access. In addition, the central telematics host computer can provide information that may be relevant to the driver/passengers, such as tourist information, other point of interest information, news information, and traffic information relative to location information e.g., address or coordinates) corresponding to the location where the triggering event (turning off the vehicle) occurs.

DETAILED DESCRIPTION

As a preliminary matter, it will be readily understood by those persons having ordinary skill in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
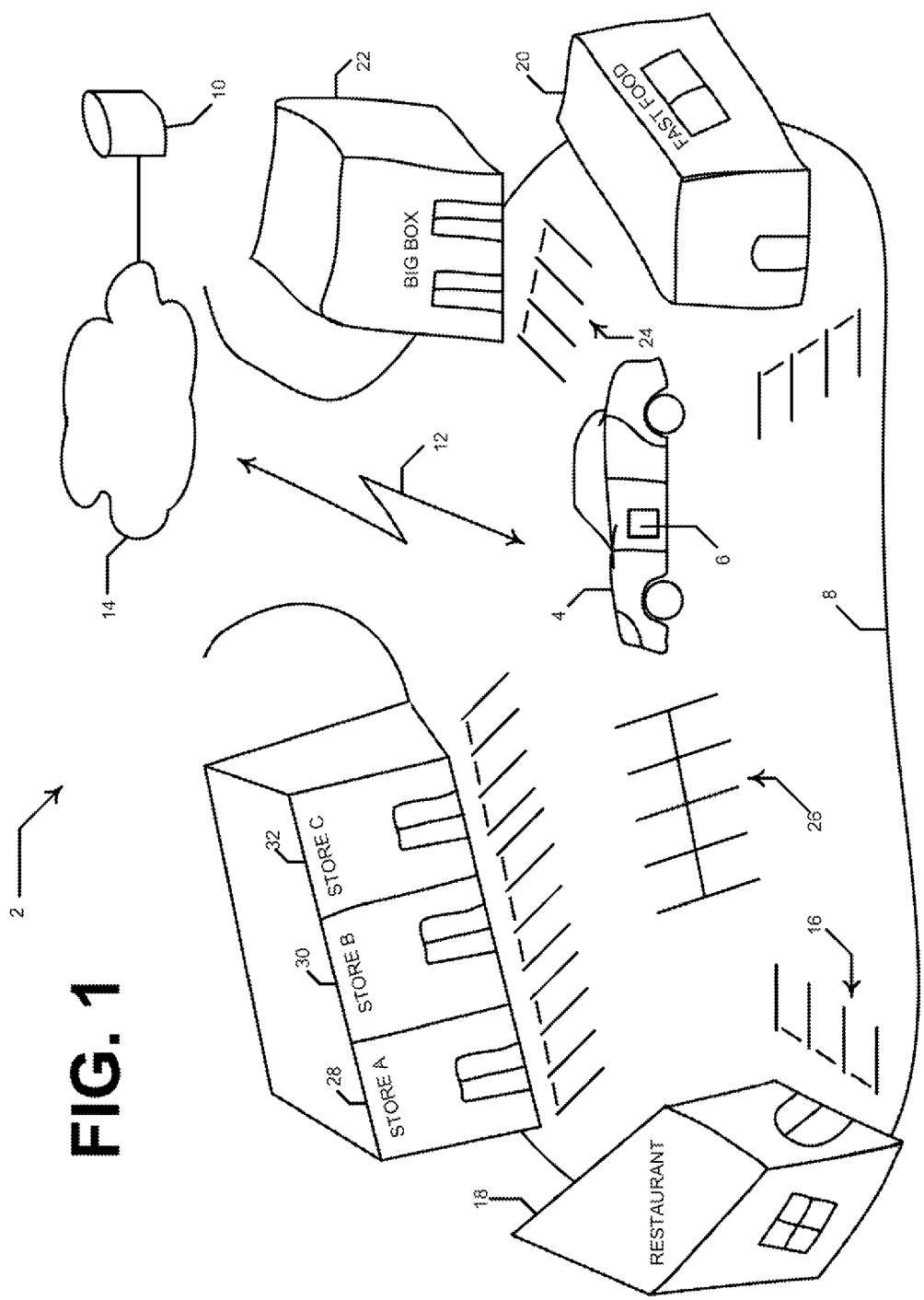
FIG. 1 illustrates a system for generating and delivering targeted content to a user device.

Turning now to the drawings, FIG. 1 illustrates a system 2 for generating and delivering targeted content to a user device. The user device is preferably a mobile device, such as a cellular phone, smart phone, tablet, personal message device, and the like that is associated with the user. Alternatively, the user device may be a mobile communication device that composes vehicle 4. The user is typically either a driver or passenger of vehicle 4. The figure does not show the user device, which is distinct from device 6, which preferably composes vehicle 4. Device 6 is preferably a telematics device, and may be, or may not be, the same device as the user device associated with the user.

Upon entering parking lot 8, the driver of vehicle 4 typically steers it into a parking place located near a store where he, or she, plans to shop. Upon parking and turning off vehicle 4, telematics device 6 transmits a key-off message, or similar trigger message, indicating that the car has parked. The message, transmitted over wireless link 12, typically also includes location information, such as for example, GPS longitude and latitude coordinates. The location information could comprise cellular network tower proximity information as well.

Telematics device 6 sends the message over link 12 to communication network 14, which may include multiple networks of varying type and purpose, including cellular networks, optical networks, the Internet wire-line telephone networks, local area networks, and the like. A telematics server 10, typically residing at a central computer host location operated by a telematics services provider is coupled to network 14 and uses the network and link 12 to communicate with vehicle 4.

Advertisers may use system 2 a variety of ways to target a user/driver/passenger of vehicle 4. In addition, content other than from the vendors shown in the figure may also transmit content to a user device upon a turn-off event of vehicle 4 that occurs in parking lot 8.

As one example, if vehicle 4 parks in a parking place 16 in front of restaurant 18, upon the driver turning off the engine, telematics device 6 may transmit a message to server 10 indicating the longitude and latitude coordinates of the vehicle. Server 10 may then search a database stored thereon, or accessible therefrom (perhaps the database is stored on a server remote from server 10 but in communication therewith over network 14). Server 10 can use information contained in the message transmitted from the vehicle, which may include a vehicle identification number ("VIN") information about the driver (typically based which key fob or the like is used to operate the vehicle) and the location coordinates, to search for content that matches the information received in the message. The match between the received information and the information associated with content stored on server 10, or accessible therefrom, may be based on predetermined criteria associated with the content by a content provider, typically an advertiser or perhaps a news provider.

The advertiser may be restaurant 18 and the content delivered to the use device or devices associated with vehicle 4, typically via the vehicle's VIN, may include coupons for, or announcements about, a special entree or meal discount. In an alternate embodiment, although vehicle 4 parks in front of restaurant 18, the content could be associated with fast food restaurant 20. Server 10 could determine, based on GPS coordinates transmitted from vehicle 4 upon turning off the car that the car was located in front of restaurant 18. If restaurant 20 has a commercial arrangement with the operator of server 10 to provide advertising content to subscribers of telematics services offered by said operator, then server 10 could generate a discount coupon for a food product that might appeal to a would-be patron of restaurant 18. By sending the discount coupon to a smartphone of a user associated vehicle 4 upon turn-off of the vehicle, restaurant 20 might entice the user to eat at restaurant 20 rather than at restaurant 18.

In another embodiment, the operator of Big Box store 22 might have an arrangement with the telematics services provider so that when vehicle 4 turns off in a parking space 24, server 10 can generate and forward a discount for an item that might not be advertised in the store. In addition, using the VIN corresponding to vehicle 4, server 10 could determine what type vehicle 4 is and generate the content accordingly. For example, if vehicle 4 is a pick-up truck, the content delivered to a user's smart phone may be a coupon for a discount on a large display device, such as a television or a recliner chair, which could only fit inside a pickup truck. Alternatively, if the VIN of vehicle 4 indicates that it is a small compact car, a discount coupon might include a buy-one-get-one-free discount for a toiletry item or for a towel set that could easily fit inside the compact car. Thus, the information transmitted from device 6 upon turn-off of vehicle 4 could be used to tailor the advertised item, or information, to the vehicle and what type of cargo it can handle.

In another embodiment, if vehicle 4 parks in one of parking spaces 26, a vehicle turn-off message may correspond to an equal likelihood that a user of the vehicle may be amenable to shopping in any of restaurants 18 or 20, Big Box store 22, or stores A, B, or C, referred to by numerals 28, 30, and 32, respectively. Upon receiving information in a message from telematics device 6 that vehicle has been turned off in parking spaces 26, server 10 may analyze the information and determine, based on VIN and key fob used to operate the car, that a unmarried man is driving his sport car (vehicle 4). If stores 28, 30, and 32 all sell clothing, but stores A and B sell exclusively women's fashion, then server 10 may cause only a discount coupon to be generated for sporting goods store C. If server 10 determines that a woman is driving vehicle 4, based on telematics subscriber information, or key fob usage, then the server may transmit discount coupons for items in both stores A 28 and B 30 to the driver's smart phone.

It will be appreciated that in some embodiments, the driver's or passenger's smart phone may also function as part of the telematics device 6 (also referred to as mobile vehicle device), inasmuch as a device coupled to a vehicle diagnostics bus, or other data bus, could determine that the vehicle has been turned off, and communicate information regarding the same over a wired, or short range wireless, link to the smartphone, which could then transmit the information, including VIN and key fob data, to server 10.

In other embodiments, the user's smartphone may perform the roles of telematics device 6. For example, accelerometers in the smartphone could detect cessation of vibration from the vehicle's engine, thus deeming that the car has been turned off. Upon determining the cessation of engine vibration, the smartphone may determine its current location coordinates from its GPS circuitry, and transmit same along with the VIN of vehicle 4 to server 10. Alternatively, since the telematics services provider, or other entity, that operates server 10 may already have demographic information associated with the smart phone, the message transmitted from the smartphone upon turn-off may not include the VIN or key fob information. However, for the scenario described above wherein server 10 determines content to send to the user's smartphone, or other user device based on the type of vehicle 4, the smartphone preferably transmits the VIN, even if the user's smartphone is functioning as the telematics device.

Figure 2:
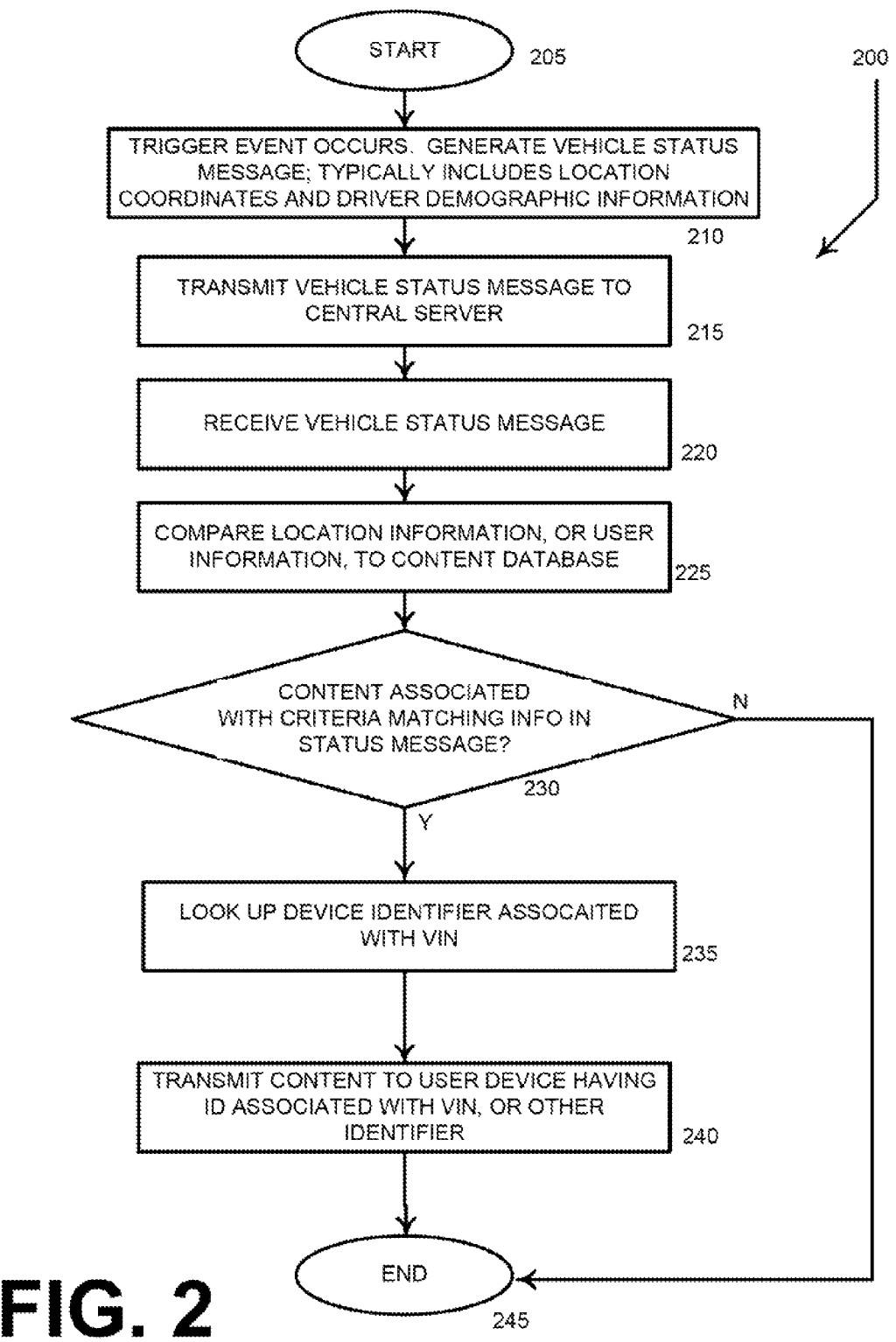
FIG. 2 illustrates a flow diagram of a method for generating and delivering targeted content to a user device.

Turning now to FIG. 2, the figure illustrates a flow diagram of a method for generating and delivering targeted content to a user device. Method 200 begins at step 205. At step 210, a vehicle trigger event occurs and a device coupled with (typically via wire or wireless link), or proximate to, a vehicle generates a vehicle status message. The device coupled to the vehicle may be a telematics device coupled to a vehicle data bus, for example a CAN bus, or other similar communication bus, wire, terminal(s), wireless frequency, and the like. Or, the device may be a device of a user (i.e., such as a driver or passenger of the vehicle), such as a smart phone, media content player, a tablet, a PC, a cellular telephone, and the like. The trigger event can be the turn off sequence the driver performs when parking a vehicle (i.e., turns of the engine and removes the key, or presses a stop button). In addition, a trigger event can be the coming into proximity of a particular place of business, or other type of establishment, or place, based on geofences programmed into the device coupled with, or proximate to, the vehicle. Also, if the vehicle is equipped with an RFID initiator that energizes an RFID device embedded into a parking lot space proximate, or relatively near a place as compared to other nearby parking places, the telematics device, or similar, of the car can retrieve information broadcast from, or otherwise disseminated from, the embedded RFID device. The telematics device may then assemble the information, which could include location information such a GPS coordinates, or information identifying the vendor operating the proximate place of business, into a vehicle status message to transmit to the telematics services provider's remote host computer server. The information in the vehicle status message may include information regarding the driver or passengers. Such vehicle occupant information may be determined from a particular fob used to operate the vehicle, biometric sensors such as fingerprint, voice print detection, weight sensors in the seats, breathalyzer sensors, and the like.

At step 215, the telematics device, or mobile vehicle device, at the vehicle transmits the vehicle status message to the telematics services provider's remote host computer system. It will be appreciated that reference to the telematics services provider can also include reference to a computer server associated with an entity that operates a place near the location of the vehicle at the trigger location. For example, in reference to FIG. 1, the corporate operator of fast food restaurant 20 may operate a server that receives the transmitted vehicle status message and determines a discount coupon to offer to the driver, or a passenger of vehicle 4. In such a scenario, a telematics services operator may serve as an intermediary inasmuch as it may receive the vehicle status message, processes it, and forward it via a communication network to the corporate operator of restaurant 20, which would determine the offer to make to the driver. Alternatively, the telematics services provider may be authorized by the corporate operator to determine the offer itself and use information it stores for its customers (i.e., the driver of vehicle 4) to determine an appropriate offer. Typically, the telematics services provider/operator or central host computer 10, will have the VIN of vehicle 4 stored at server 10, as well as one, or more, user identifiers for one or more corresponding user devices that are associated with the vehicle (typically according to VIN but such association could also be according to a device identifier of telematics device 6 or a telematics subscriber's account number). In an aspect, a rental car company may itself, or a telematics services provider under contract with same, may associated a vehicle lessee's user device with a leased vehicle and when the leased vehicle sends a vehicle status message, the remote central host computer determines content based on the vehicle's location coordinates or other location information, (either current, or perhaps even historical during a given period) and causes the transmission of content to the user's device. As discussed above, the user device associated with the vehicle may be the telematics device 6 itself, but preferably are personal mobile devices of the users (driver and passengers if any) of the vehicle. Thus, the telematics services provider server can identify a vehicle, or device thereof that transmitted a vehicle status message, and then use one or more identifiers of one or more associated devices as recipients of one or more reply messages, if any.

Thus, after receiving a vehicle status message sent by a mobile vehicle device associated with a vehicle at step 220, the telematics server 10 compares information contained in the vehicle status message with one, or more, tables or databases at step 225, and determines at step 230 whether the vehicle has been turned of (or some other trigger condition has occurred) near a place of business that it has a relationship with. If not, method 200 advances to step 245 and ends.

However, if the telematics services provider determines at step 230 that information received in the vehicle status message matches information in an index field associated with content it has stored, has access to, or can locate (find), then the server advances to step 235. At step 235 the server looks up one or more device identifiers associated with information contained in the vehicle status message (e.g., the vehicle's VIN or identifier of telematics device 6, which could include a users smart phone or other wireless mobile device) and transmits at step 240 the content associated with the matching information before ending at step 245.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

The invention claimed is:
1. A method, comprising:
receiving, by a device and from a mobile vehicle device associated with a vehicle, a vehicle status message,
the vehicle status message being provided by the mobile vehicle device to the device when the vehicle is turned off,
the vehicle status message including vehicle information and location information associated with the vehicle,
the vehicle information including information that identifies a driver of the vehicle and at least one passenger of the vehicle;
comparing, by the device, the vehicle information, included in the vehicle status message, and customer profile information;
identifying, by the device and based on comparing the vehicle information and the customer profile information, a first customer profile associated with the driver of the vehicle and a second customer profile associated with the at least one passenger of the vehicle;
comparing, by the device, the first customer profile, the second customer profile, the location information, and target criteria associated with content;
determining, by the device, particular content to transmit to a user device associated with the driver of the vehicle based on comparing the first customer profile, the second customer profile, the location information, and the target criteria; and
transmitting, by the device, the particular content in a content message to the user device associated with the driver of the vehicle,
the particular content including targeted information associated with the first customer profile, the second customer profile, and the location information.

2. The method of claim 1 wherein the target criteria includes a range of location coordinates.

3. The method of claim 2 wherein the range of the location coordinates defines a geofence.

4. The method of claim 1 wherein the target criteria includes vehicle identification information that identifies the vehicle.

5. The method of claim 1 wherein the target criteria includes demographic information associated with the driver of the vehicle.

6. The method of claim 1 wherein:
the mobile vehicle device is associated with the vehicle by the device; and
the user device is associated with the vehicle by the device.

7. The method of claim 1 wherein the mobile vehicle device and the user device are separate devices.

8. A device, comprising:
one or more processors to:
receive, from a mobile vehicle device associated with a vehicle, a vehicle status message,
the vehicle status message being provided by the mobile vehicle device to the device when the vehicle is turned off,
the vehicle status message including vehicle information and location information associated with the vehicle,
the vehicle information including information that identifies a driver of the vehicle and at least one passenger of the vehicle;
compare the vehicle information, included in the vehicle status message, and customer profile information;
identify, based on comparing the vehicle information and the customer profile information, a first customer profile associated with the driver of the vehicle and a second customer profile associated with the at least one passenger of the vehicle;
compare the first customer profile, the second customer profile, the location information, and target criteria associated with content;
determine particular content to transmit to a user device associated with the driver of the vehicle based on comparing the first customer profile, the second customer profile, the location information, and the criteria; and
transmit the particular content in a content message to the user device associated with the driver of the vehicle,
the particular content including targeted information associated with the first customer profile, the second customer profile, and the location information.

9. The device of claim 8 wherein the target criteria includes a range of location coordinates.

10. The device of claim 9 wherein the range of the location coordinates defines a geofence.

11. The device of claim 8 wherein the target criteria includes vehicle identification information that identifies the vehicle.

12. The device of claim 8 wherein the target criteria includes demographic information associated with the driver of the vehicle.

13. The device of claim 8 wherein:
the mobile vehicle device is associated with the vehicle by the device; and
the user device is associated with the vehicle by the device.

14. The device of claim 8 wherein the mobile vehicle device and the user device are separate devices.

15. A non-transitory computer-readable medium storing instructions, the instructions comprising:
one or more instructions that, when executed by one or more processors of a device, cause the one or more processors to:
receive, from a mobile vehicle device associated with a vehicle, a vehicle status message,
the vehicle status message being provided by the mobile vehicle device to the device when the vehicle is turned off,
the vehicle status message including vehicle information and location information associated with the vehicle,
the vehicle information including information that identifies a driver of the vehicle and at least one passenger of the vehicle;
compare the vehicle information, included in the vehicle status message, and customer profile information;
identify, based on comparing the vehicle information and the customer profile information, a first customer profile associated with the driver of the vehicle and a second customer profile associated with the at least one passenger of the vehicle;
compare the first customer profile, the second customer profile, the location information, and target criteria associated with content;
determine particular content to transmit to a user device associated with the driver of the vehicle based on comparing the first customer profile, the second customer profile, the location information, and the target criteria; and
transmit the particular content in a content message to the user device associated with the driver of the vehicle,
the particular content including advertising information or coupon information associated with the first customer profile, the second customer profile, and the location information.

16. The non-transitory computer-readable medium of claim 15 wherein the target criteria includes a range of location coordinates.

17. The non-transitory computer-readable medium of claim 16 wherein the range of the location coordinates defines a geofence.

18. The non-transitory computer-readable medium of claim 15 wherein the target criteria includes vehicle identification information that identifies the vehicle.

19. The non-transitory computer-readable medium of claim 15 wherein the target criteria includes demographic information associated with the driver of the vehicle.

20. The non-transitory computer-readable medium of claim 15, where the mobile vehicle device and the user device are separate devices.

* * * * *